UNITED STATES PATENT OFFICE.

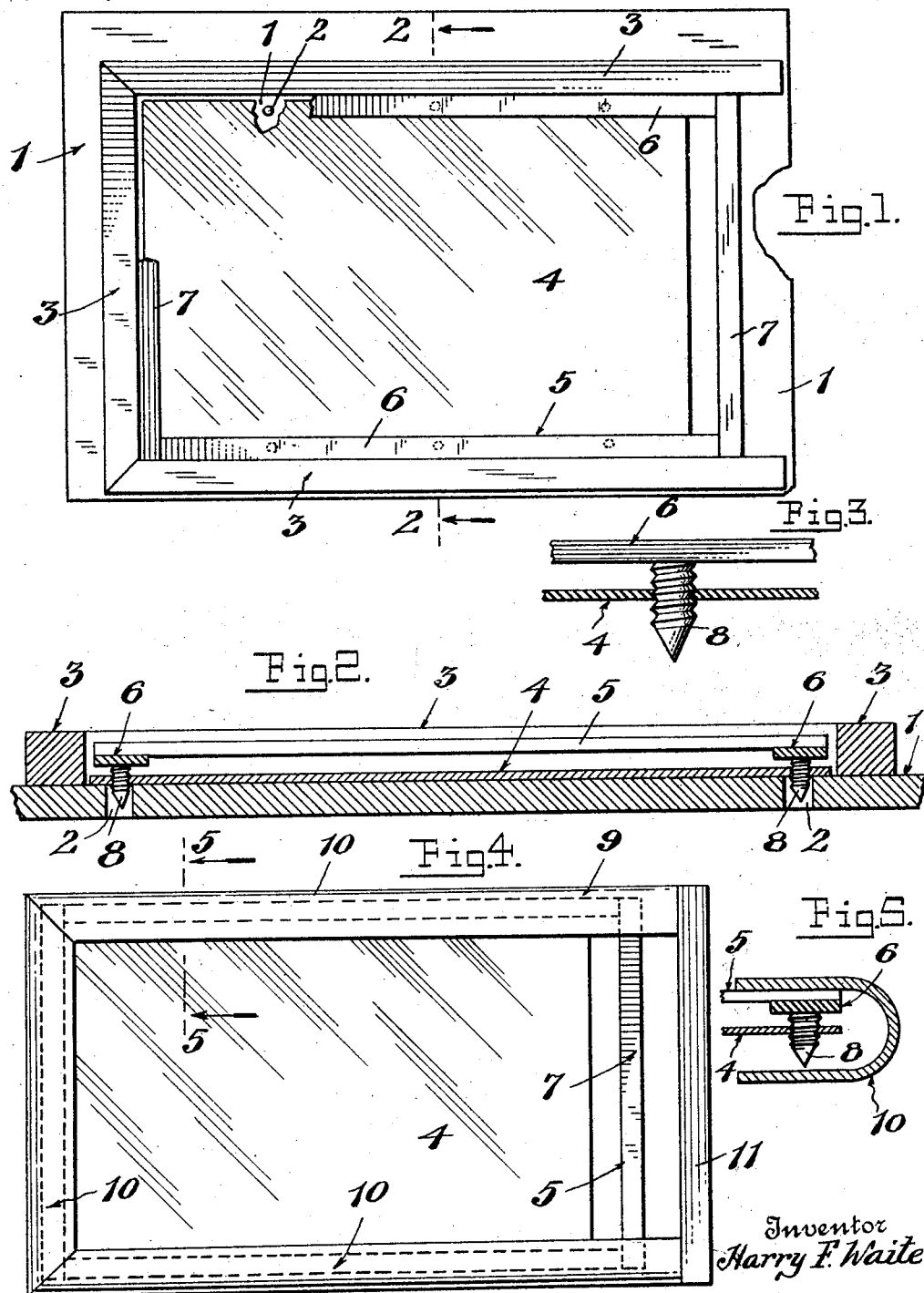

HARRY F. WAITE, OF NEW YORK, N. Y.

FILM HOLDER FOR DEVELOPING FILMS.

1,413,208.  Specification of Letters Patent.  Patented Apr. 18, 1922.

Application filed March 18, 1921. Serial No. 453,537.

*To all whom it may concern:*

Be it known that I, HARRY F. WAITE, a citizen of the United States, and a resident of the city of New York, county of Queens, and State of New York, have invented a new and useful Improvement in Film Holders for Developing Films, of which the following is a specification.

The object of my invention is to provide a device which will enable films to be used with the same facility as plates. While this invention may be used for any kind of film it is particularly applicable to large films such as are used in X-ray work. One embodiment of my invention, which accomplishes this object, is hereinafter more particularly set forth.

For a more detailed description of my invention, reference is to be had to the accompanying drawings, forming a part hereof, in which—

Figure 1 is a plan view of a guide, a film and my improved means for handling a film.

Figure 2 is a sectional view taken on the lin 2—2 of Figure 1, looking in the direction of the arrows.

Figure 3 is an enlarged sectional view, showing a film attached to my improved stretching means.

Figure 4 shows the film and stretching means in a frame which may be used for developing and other purposes.

Figure 5 is a sectional view taken on the line 5—5 of Figure 4, looking in the direction of the arrows.

Throughout the various views of the drawings, similar reference characters designate similar parts.

In the practice of my invention I provide a flat surface, 1, as a table top which has suitable perforations 2 which are placed at convenient locations, as will appear below, and three fixed guides 3 which rest on top of the table and are found on three sides of a film 4 so that the film will easily run true with regard to the holes 2 which are under its side edges when it is placed on the table 1.

The guides 3 also guide a frame 5, which in the preferred embodiment of my invention, has two side strips 6 and two end strips 7 and each of the side strips has downwardly extending, sharpened and roughened pins 8 which are adapted to enter the holes 2 and perforate the film 4 when the frame 5 is placed thereon, as shown in Figures 1 and 2 so that when the frame 5 is put in place and pressed down, the pins 8 engage and support the film 4 and hold the same stretched in such a manner that it will not be scratched. To further insure that the film 4 will not be scratched the side strips 6 are made longer than the film 4 and the pins 8 are so placed that when the frame 5 and film 4 are placed, as above described with regard to the guides 3, one of the end bars 7 is free from the film and separated from it, by a moderate distance, say one inch, so that the frame may be readily handled without danger of contact with the film. Once the film has been stretched on the frame 5, as above described, the end 7, which is a little removed from this film, is grasped by the operator who is manipulating the film and then the frame and film are removed and placed in the developing frame 9 which has three U sides 10 and one straight bar 11 across one of the shorter sides. The U sides of the frame 9 are so curved and shaped, as indicated in Figure 5, that the frame 5 may readily slide therein and the pins 8 will have their points close to an inner edge of the U bars 10 so that under no circumstances can the film 4 get off these pins 8 during the developing process. In the preferred embodiment of my invention, when the frame 5 is shoved into the frame 9 as far as possible, the bar 11 is so placed that there is space between the bar 7 and this bar 11 so that the frame 9 may be manipulated through the bar 11 without in any way disturbing the frame 5. After the parts are assembled as shown in Figures 4 and 5, the film may be developed and otherwise used while in its stretched and protected condition. After the film has been duly developed it may be removed and the frame 5 may then be used with another film.

While I have shown and described one embodiment of my invention, it is obvious that it is not restricted thereto, but that it is broad enough to cover all structures that come within the scope of the annexed claims.

Having thus described my invention, what I claim is:

1. Means for holding a film composed of a rectangular frame having roughened and pointed pins extending therefrom which are adapted to enter and hold the edges of a film so that it may be handled and developed without danger of injury.

2. In a device of the class described, roughened means for engaging and holding the edges of a film and stretching the same so that the film may be developed and handled while in its stretched condition and means for receiving the frame and film while the film is in the stretched condition so as to facilitate its handling and manipulation during the developing process.

3. Means for holding a film composed of a rectangular frame having pointed pins extending therefrom and an exterior frame with U shaped sides adapted to receive and hold the other frame.

In testimony whereof, I have hereunto set my hand and seal this 16th day of March, 1921.

HARRY F. WAITE.